United States Patent
Bass et al.

(10) Patent No.: US 12,221,991 B2
(45) Date of Patent: Feb. 11, 2025

(54) MULTI-WIDTH CLOTH GRIPPING WIRE CLIP

(71) Applicant: ULTICLIP, LLC, Orlando, FL (US)

(72) Inventors: Clayton Andrew Bass, Bourbonnais, IL (US); Randall Lynn Darby, Euless, TX (US)

(73) Assignee: ULTICLIP, LLC, Orlando, FL (US)

( * ) Notice: Subject to any disclaimer, the term of this patent is extended or adjusted under 35 U.S.C. 154(b) by 127 days.

(21) Appl. No.: 18/319,041

(22) Filed: May 17, 2023

(65) Prior Publication Data

US 2024/0384737 A1     Nov. 21, 2024

(51) Int. Cl.
*F16B 2/22*     (2006.01)
*A45F 5/02*     (2006.01)

(52) U.S. Cl.
CPC ............... *F16B 2/22* (2013.01); *A45F 5/021* (2013.01)

(58) Field of Classification Search
CPC .. F16B 2/22; F16B 2/248; F16B 45/02; F16B 45/248; F16B 45/036; A45F 5/021
See application file for complete search history.

(56) References Cited

U.S. PATENT DOCUMENTS

| | | | | |
|---|---|---|---|---|
| 691,396 A * | 1/1902 | Lovell | ..................... | A44C 5/145 24/600.9 |
| 1,308,519 A * | 7/1919 | Baker | ................... | F16B 45/036 24/601.3 |
| 1,654,560 A * | 1/1928 | Sterling | .................... | A45D 8/26 132/279 |
| 3,465,392 A * | 9/1969 | Schmidt, Jr. | ............. | A44B 9/12 24/709.1 |
| 4,231,380 A * | 11/1980 | Seiller | ...................... | A45D 8/26 132/279 |
| 5,170,535 A * | 12/1992 | Strong | ...................... | B42F 1/08 40/659 |
| 6,234,706 B1 * | 5/2001 | Hodzic | ................... | F16B 21/20 403/252 |
| 10,136,626 B1 * | 11/2018 | Rider | .................... | A44C 15/005 |
| 10,342,453 B2 * | 7/2019 | Maciejewski | ........... | A61B 5/055 |
| 2006/0108480 A1 * | 5/2006 | Goodwin | .............. | F16L 3/1233 248/63 |
| 2013/0236241 A1 * | 9/2013 | Kasper | ............... | G01R 33/3802 403/327 |
| 2014/0060895 A1 * | 3/2014 | Chen | .................... | H05K 1/0203 24/462 |
| 2016/0338501 A1 * | 11/2016 | Conway | .................... | F16B 2/22 |

\* cited by examiner

*Primary Examiner* — Jason W San
*Assistant Examiner* — Rowland Do
(74) *Attorney, Agent, or Firm* — INNOVATION CAPITAL LAW GROUP, LLP; Vic Lin

(57) ABSTRACT

A clip assembly allows users to adjust the position at which the clip is mounted, allows for variance in mounting positions and styles, provides adjustability to allow a varying width of belts or webbing, and has cloth gripping abilities. The clip assembly can include a wire clip that is adjustably attached to a mounting base. The wire clip can, for example, be mounted facing upward, relative to the mounting base, downward, relative to the mounting base, or may adjustably slide to a desired position relative to the mounting base. A spacer may be provided that can adjust a size of an opening of the wire clip. The spacer may also provide a fabric catch member for helping keep the clip assembly in a desired position.

19 Claims, 7 Drawing Sheets

MULTI-WIDTH CLOTH GRIPPING WIRE CLIP

BACKGROUND OF THE INVENTION

1. Field of the Invention

Embodiments of the invention relate generally to clips. More particularly, embodiments of the invention relate to a clip that permits a user to securely carry items by providing an attachment point to a belt or webbing, as well as providing a way to grip onto fabric or material. The clip assembly can be attached to a variety of objects, by means of, but not limited to a screw, bolt and nut, adhesive tape, glue, epoxy, cordage, twine, or stitching it between layers of fabric. The clip assembly can be utilized to, but not limited to, carry pouches, bags, holsters, knives, cases, or an item that one would wish to attach to one's belt, pocket, fabric, clothing, bag, wearable object, or pack, for example.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

There are a variety of clips formed out of metal or plastic. Metal clips can be formed out of flat strips of metal, bent wire, or formed plastic. Bent wire clips have been created in many forms, however, they do not offer the ability to grasp onto fabric and also have the ability to wrap around a belt without any modification. Additionally, they do not offer the ability to adjust the location at which the clip is mounted to an object. The ability to adjust the belt size that a wire clip fits around is not currently offered.

In view of the foregoing, there is a need for a clip assembly that can offer solutions for the shortcomings of conventional clips.

SUMMARY OF THE INVENTION

Aspects of the present invention allow a user to be able to secure an object to a belt, clothing, or wearable object utilizing a clip that is positionable in mounting height, where the clip is adjustable in the size of the belt that it can accommodate, and the clip is able to grip material or fabric.

Embodiments of the present invention provide a clip assembly comprising a wire clip having a clip leg extending in a first direction, a clip hoop turning the clip into a clip rear portion extending in a second direction, spaced apart from the clip leg, the clip rear portion having a bend toward the clip leg to provide a clip return, forming a clip belt space within the clip; a mounting base having a mounting base leg channel for receiving a portion of the clip leg therein; and a fastener for securing the wire clip to the mounting base.

Embodiments of the present invention provide a clip assembly comprising a wire clip having a pair of clip legs extending in a first direction, a pair of clip hoops turning the clip into a pair of clip rear portions, each extending in a second direction, opposite the first direction and spaced apart from the pair of clip legs, each of the pair of clip rear portions having a bend toward respective ones of each of the pair of clip legs to provide a pair of clip returns, forming a clip belt space within the clip; a mounting base having a pair of mounting base leg channel for receiving a portion of each of the pair of clip legs therein; a fastener for securing the wire clip to the mounting base, the fastener extending between the pair of clip legs; a pair of clip leg retainers formed at a terminus of each of the pair of clip legs, each of the pair of clip leg retainers extending at an angle relative to the respective ones of the pair of clip legs, the angle bending each of the pair of clip leg retainers away from each of the pair of clip rear portions; and at least one set of two mounting base leg holes formed in the mounting base, the at least one set of two mounting base leg holes operable to receive the pair of clip leg retainers to prevent sliding of the wire clip relative to the mounting base.

Embodiments of the present invention provide a clip assembly comprising a wire clip having a pair of clip legs extending in a first direction, a pair of clip hoops turning the clip into a pair of clip rear portions, each extending in a second direction, opposite the first direction and spaced apart from the pair of clip legs, each of the pair of clip rear portions having a bend toward respective ones of each of the pair of clip legs to provide a pair of clip returns, forming a clip belt space within the clip; a mounting base having a pair of mounting base leg channel for receiving a portion of each of the pair of clip legs therein; a fastener for securing the wire clip to the mounting base, the fastener extending between the pair of clip legs; a pair of clip leg retainers formed at a terminus of each of the pair of clip legs, each of the pair of clip leg retainers extending at an angle relative to the respective ones of the pair of clip legs, the angle bending each of the pair of clip leg retainers away from each of the pair of clip rear portions; at least one set of two mounting base leg holes formed in the mounting base, the at least one set of two mounting base leg holes operable to receive the pair of clip leg retainers to prevent sliding of the wire clip relative to the mounting base; and a spacer disposed above and spanning between each of the pair of clip legs at the bend in the wire clip, wherein the mounting base includes a mounting base slot, the mounting base slot operable to receive a fastener therein for securing the mounting base to an object to be carried by the clip assembly; and an upper surface of the mounting base slot is lower than an upper surface having a mounting base hole formed therethrough.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1A:
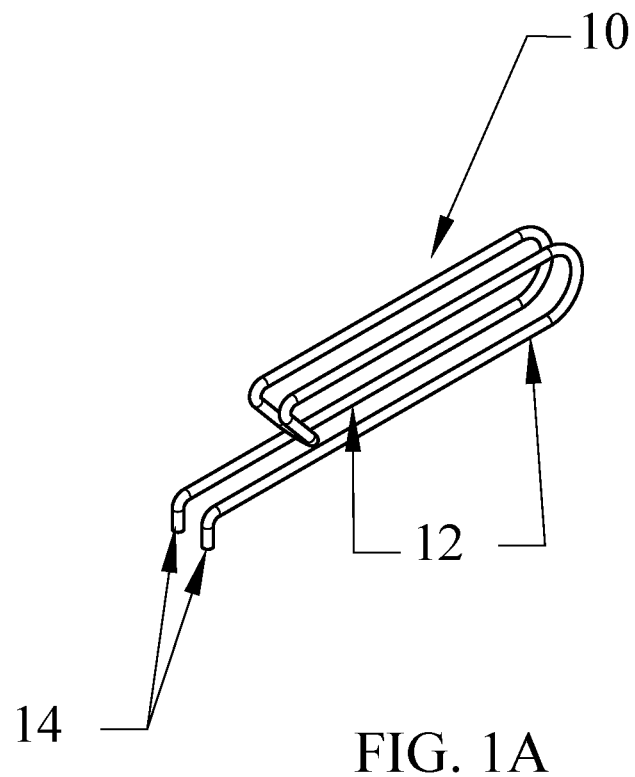
FIG. 1A illustrates a perspective view of a wire clip usable in a clip assembly according to an exemplary embodiment of the present invention.

The illustrations in the figures may not necessarily be drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any apparatus, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a clip assembly that allows users to adjust the position at which the clip is mounted, allows for variance in mounting positions and styles, provides adjustability to allow a varying width of belts or webbing, and has cloth gripping abilities. The clip assembly can include a wire clip that is adjustably attached to a mounting base. The wire clip can, for example, be mounted facing upward, relative to the mounting base, downward, relative to the mounting base, or may adjustably slide to a desired position relative to the mounting base. A spacer may be provided that can adjust a size of an opening of the wire clip. The spacer may also provide a fabric catch member for helping keep the clip assembly in a desired position.

The clip assembly can be constructed out of metal, composite, or plastic, for example. Each component described herein can, for example, be formed out of a single piece of the desired material and assembled as described below.

Figure 1B:
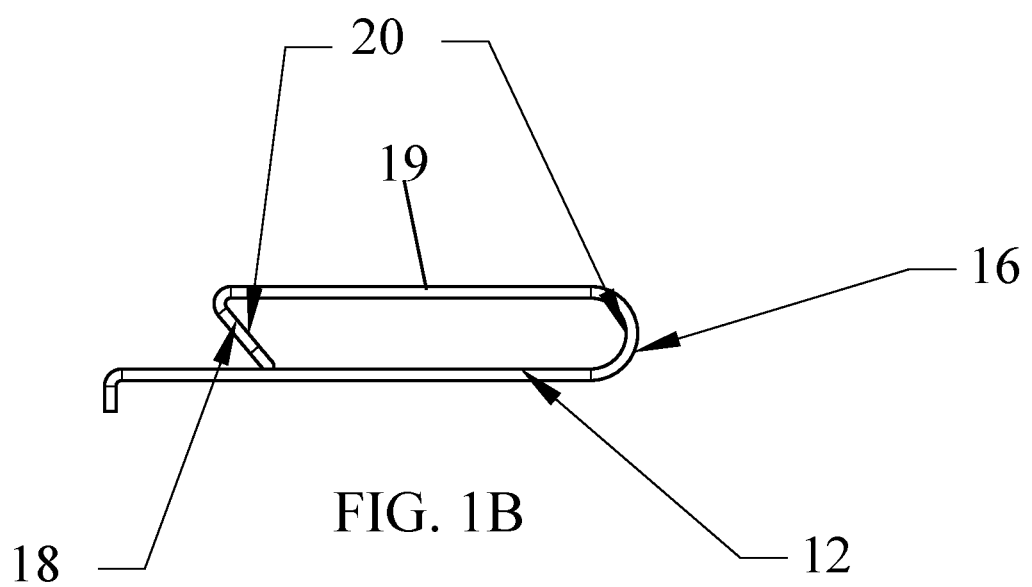
FIG. 1B illustrates a side view of the wire clip of FIG. 1A.

Referring to FIGS. 1A and 1B, a wire clip 10 includes clip legs 12 and a clip leg retainer 14. The clip leg retainer 14 can formed by a 90-degree bend at the end of both clip leg 12 and can interface with the mounting base 32, as discussed below, referencing FIG. 3A. The bend formed by the clip leg retainer 14 may be formed in angles other than 90 degrees, as illustrated. For example, the bend to form the clip leg retainer may be from about 45 degrees to about 135 degrees, for example.

A clip belt space 20 can be formed by a clip hoop 16, the clip leg 12, a clip rear portion 19, and the clip return 18. The clip belt space 20 is where a belt, webbing, fabric, or other material can be captured and held by the wire clip 10. The wire clip 10 may be made in different sizes to accommodate different size belts, for example. However, as discussed below, a spacer may be optionally used to further adjust the side of the clip belt space.

Figure 2A:
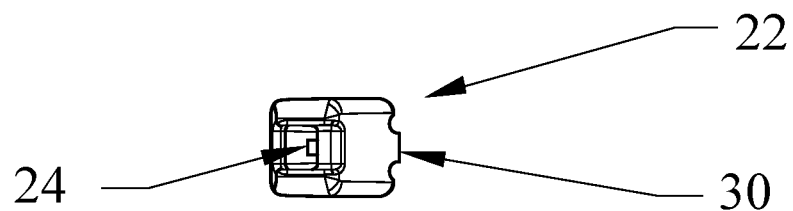
FIG. 2A illustrates a top view of a spacer usable on the wire clip of FIG. 1A.
Figure 2B:
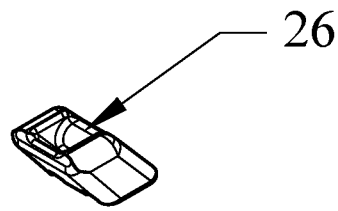
FIG. 2B illustrates a perspective view of the spacer of FIG. 2A.
Figure 2C:
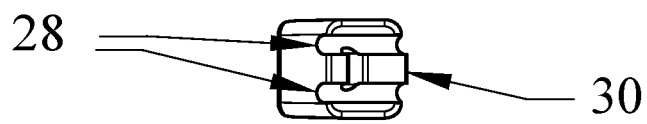
FIG. 2C illustrates a bottom view of the spacer of FIG. 2A.
Figure 2D:
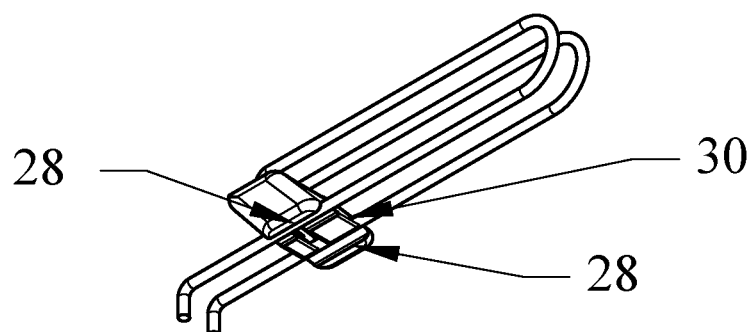
FIG. 2D illustrates a perspective view of the spacer of FIG. 2A, attached to the wire clip of FIG. 1A.

Referring to FIGS. 2A through 2D, a spacer 22 can include a spacer return tab 24, as best seen in FIG. 2A, that retains the clip return 18 (see FIG. 1B) when the clip return 18 is inserted into a spacer clip return channel 26. This allows the spacer 22 to be firmly attached to the wire clip 10. The clip return 18 can be seen inserted into the spacer clip return channel 26 in FIGS. 2B and 2D. In FIG. 2C, spacer clip leg channels 28 are shown, which provide a space for the clip leg 12 to recess below the bottom of the spacer 22. A spacer fabric catch 30 can be seen in FIG. 2C. The spacer fabric catch 30 can provide an edge that catches fabric, in conjunction with the spacer clip leg channels 28. The spacer fabric catch 30 and spacer clip leg channels 28 extend below the bottom of the clip leg 12, as best illustrated in FIG. 2D. These elements provide a fabric-catching ability of the spacer 22.

Figure 3A:
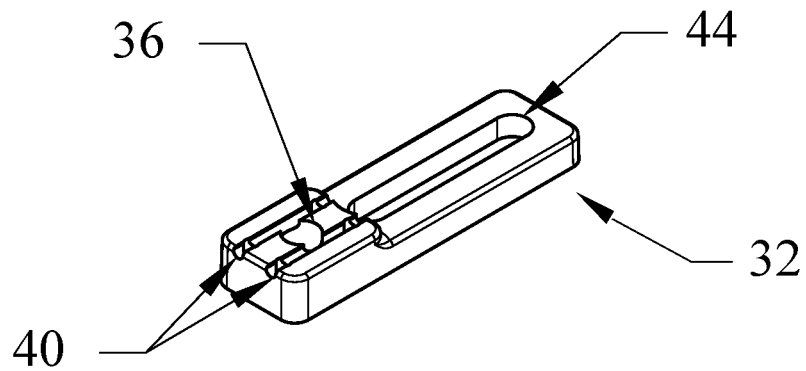
FIG. 3A illustrates a perspective view of a mounting base adapted to attach to the wire clip of FIG. 1A.

Referring to FIGS. 3A through 3D, a mounting base 32 can provide an attachment system for the wire clip 10. The mounting base 32 can be attached to various objects that are desired to be carried on one's wearable object, belt, or self. The mounting base 32, for example, can be attached to an object by, but not limited to, screws, bolts, glue, epoxy, tape, or sewn into fabric. In FIG. 3A, a mounting base hole 36 can provide the means to secure the wire clip 10. One example of the wire clip 10 mounted to the mounting base 32 can be seen in FIG. 4, where a screw 38 is used to secure the wire clip 10 to the mounting base 32, using the mounting base hole 36, to form one embodiment of a clip assembly. A screw, bolt, or other fasteners can be utilized to secure the wire clip 10 to the mounting base 32 through the mounting base hole 36. The mounting base hole 36 can be used with a screw 38 or other hardware to fasten the mounting base 32 to a desired object.

As shown in FIG. 3A, a mounting base leg channel 40 is provided where the mounting base 32 interfaces with the clip legs 12. The mounting base leg channel 40 provides a recess for the clip leg 12 to lie in, allowing the wire clip 10 to slide in the mounting base leg channel 40. The mounting base leg channel 40 allows only one degree of movement for the wire clip 10 when the mounting base leg hole(s) 42 are not used. Typically, the wire clip 10 can slide in the mounting base leg channels 40 in a direction that is generally parallel with a longitudinal axis of the mounting base 32.

Figure 3B:
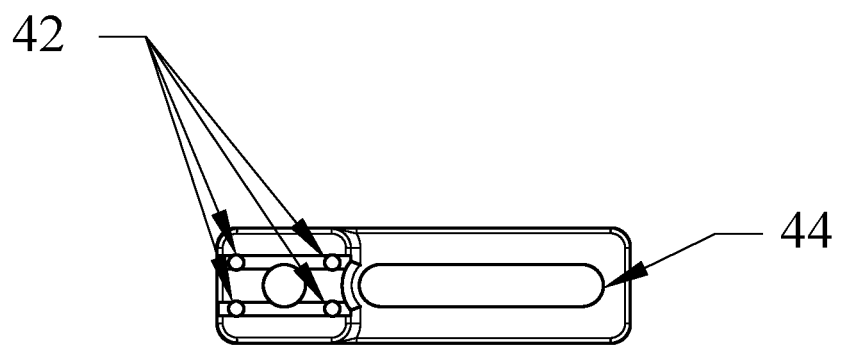
FIG. 3B illustrates a top view of the mounting base of FIG. 3A.
Figure 3C:
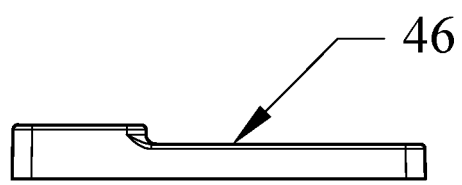
FIG. 3C illustrates a side view of the mounting base of FIG. 3A.
Figure 4:
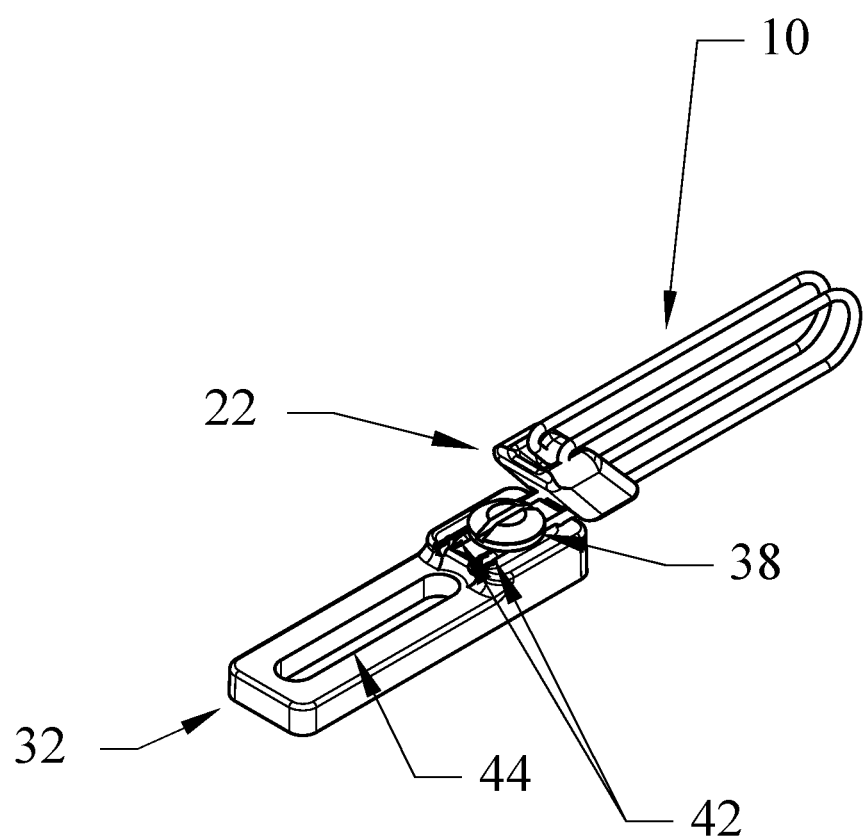
FIG. 4 illustrates a perspective view of a clip assembly arranged in a first position, with the mounting base in a downward position, including the wire clip of FIG. 1A, the spacer of FIG. 2A and the mounting base of FIG. 3A.
Figure 5A:
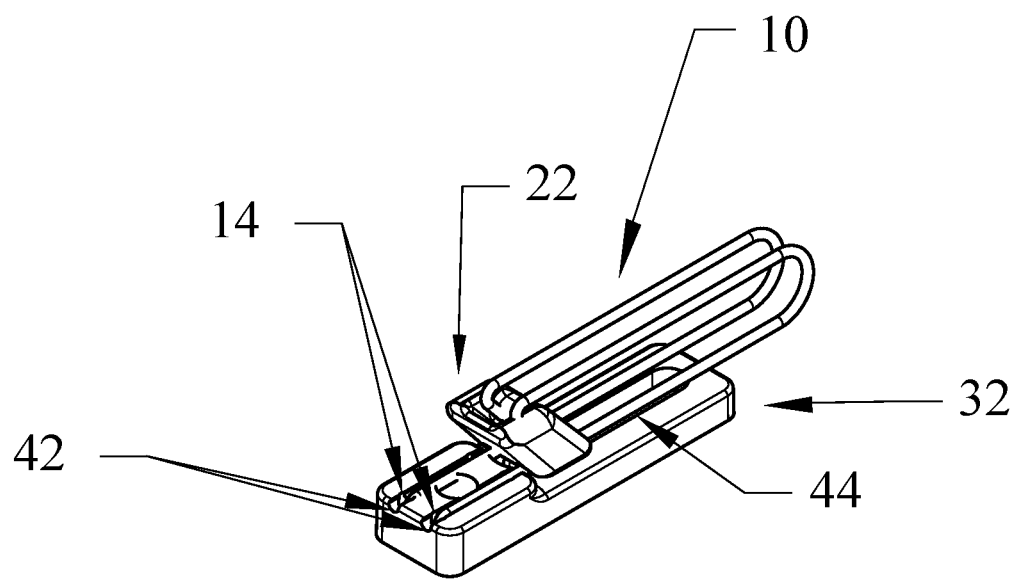
FIG. 5A illustrates a perspective view of a clip assembly arranged in a second position, with the mounting base in an upward position, including the wire clip of FIG. 1A, the spacer of FIG. 2A and the mounting base of FIG. 3A.
Figure 5B:
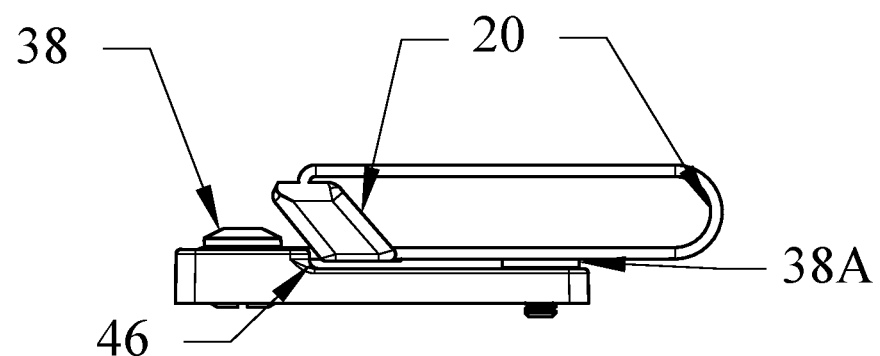
FIG. 5B illustrates a side view of the clip assembly of FIG. 5A.

The mounting base leg hole(s) 42, as best seen in FIG. 3B, can fix the wire clip 10 from sliding in the mounting base leg channel 40. The mounting base leg hole(s) 42 can interface with the clip leg retainer 14 and two of the four mounting base leg hole(s) 42 can be utilized at a single time, as shown in FIG. 4 and FIG. 5A (illustrating where each of the two sets of two (four total) the mounting base leg holes(s) 42 are used). A mounting base slot 44, as seen in FIG. 3A and in FIG. 3B, can allow additional points to fix the mounting base 32 using, but not limited to, hardware such as screws and bolts. The mounting base slot step 46, as seen in FIG. 3C, can allow for the head of the fixing hardware to fit below the wire clip 10 when the wire clip 10 is fixed to the mounting base 32. This is illustrated in FIG. 5B, where a screw 38A is shown in between the wire clip 10 and the mounting base 32, which is accommodated by the mounting base slot step 46. In other words, an upper surface of the mounting base slot is positioned lower than an upper surface of the mounting base where the mounting base hole is formed.

Figure 3D:
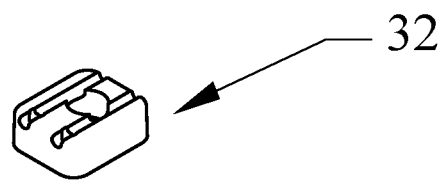
FIG. 3D illustrates a perspective view of an alternate mounting base adapted to attach to the wire clip of FIG. 1A.

In FIG. 3D, a mounting block 32 is shown without the mounting base slot 44. The mounting base slot 44 allows for variability in the attachment of the mounting block 32 but may not be required depending upon the mounting application.

FIG. 4 illustrates one possible orientation of the wire clip 10, the mounting base 32, the spacer 22 and the screw 38. The mounting base 32 is orientated so that the mounting base slot 44 is not under the clip leg 12. This is possible due to the first set of two mounting base leg holes 42 being used as shown in FIG. 4.

FIG. 5A illustrates another possible orientation of how the clip 10, the mounting base 32, and the spacer 22 could be configured. The mounting base 32 is orientated so that the mounting base slot 44 is under the clip leg 12. This is possible due to the other set of two mounting base leg holes 42 being interfaced with the clip leg retainer 14 as shown in FIG. 5A. In FIG. 5B, the clip belt space 20 is made to accommodate a smaller size belt or webbing due to the spacer 22 being utilized. Adding or removing the spacer creates variance for different sizes of belts or webbing in the clip belt space 20. A different size spacer 22, or removal thereof, as illustrated in FIGS. 7A through 7C, could allow a variety of different size belts, webbing, etc. to be accommodated in the clip belt space 20.

Figure 6:
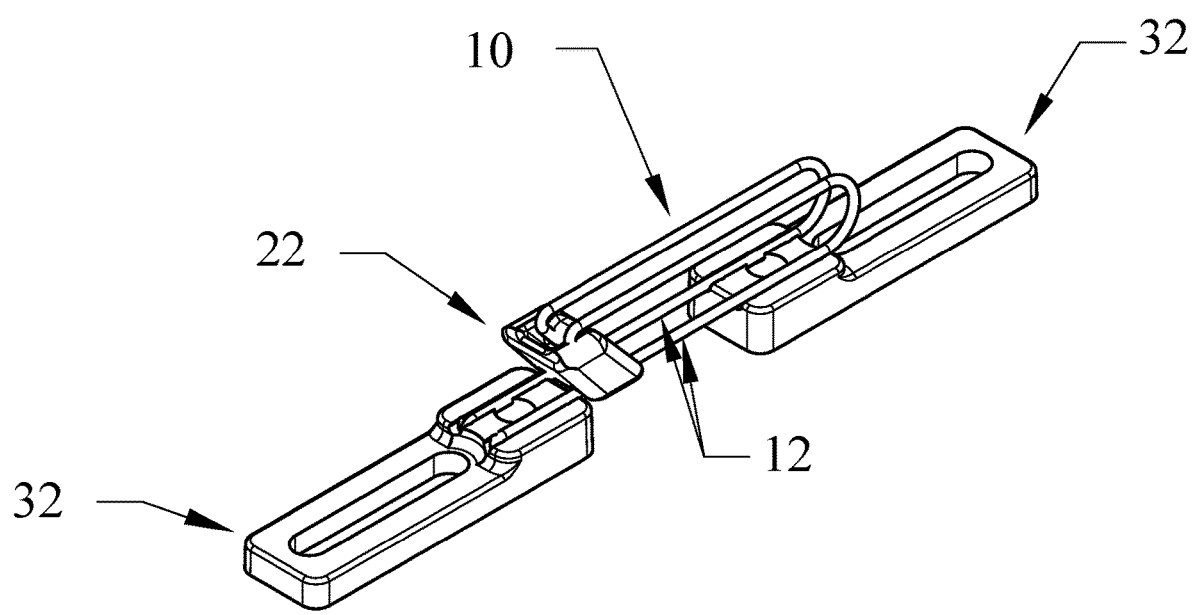
FIG. 6 illustrates a perspective view of a clip assembly arranged in the first position of FIG. 4, with the mounting base in a downward position, including the wire clip of FIG. 1A, the spacer of FIG. 2A and the mounting base of FIG. 3A, with an additional mounting base at the top of the wire clip.

FIG. 6 provides another possible representation of how the clip 10, the spacer 22, and two mounting bases 32 could be configured. By using an additional mounting base 32 on the clip leg 12, an additional point of mounting the wire clip 10 is provided. The use of a second mounting base 32 allows for additional security and increased rigidity to the wire clip 10.

Figure 7A:
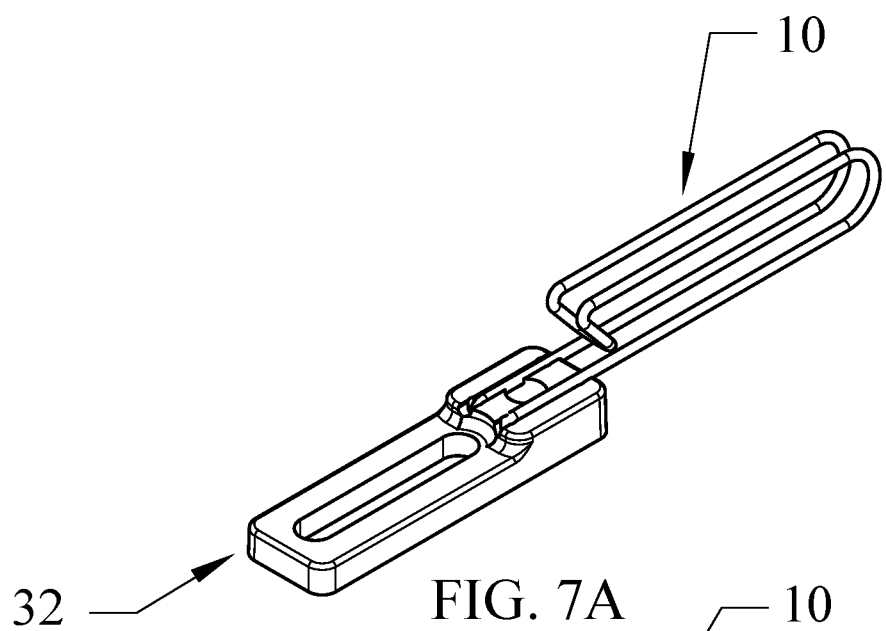
FIG. 7A illustrates a perspective view of a clip assembly in the first position of FIG. 4, with the spacer of FIG. 2A removed therefrom.
Figure 7B:
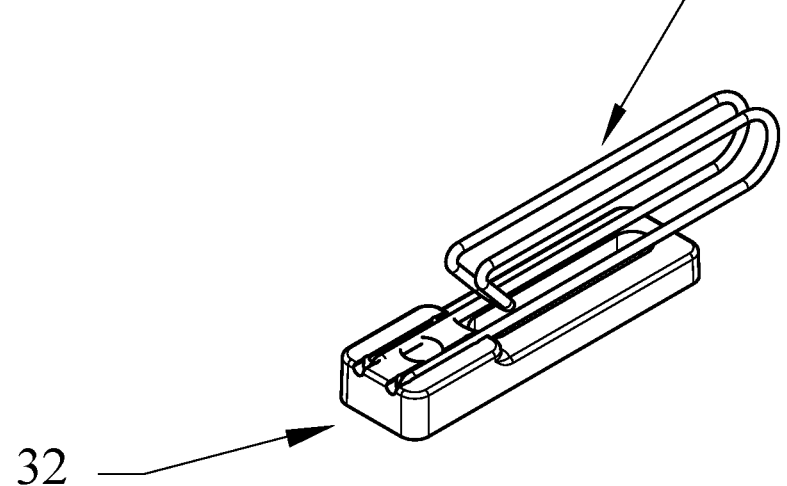
FIG. 7B illustrates a perspective view of a clip assembly in the second position of FIG. 5A, with the spacer 2A removed therefrom.
Figure 7C:
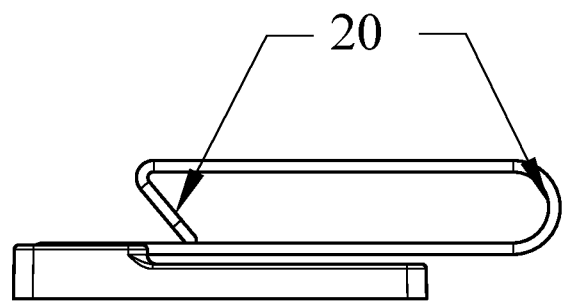
FIG. 7C is a side view of the clip assembly of FIG. 7B.

Another representation of the clip 10 and mounting base 32 can be seen in FIGS. 7A and 7B. The spacer 22 is not used in this representation. The mounting base 32 can be positioned in two possible configurations, as shown in FIG. 7A and FIG. 7B. This illustrates that the spacer 22 is not required in the use of the wire clip 10 and the mounting base 32. When the spacer 22 is not utilized, a wider belt or webbing can be accommodated in the belt space 20, as seen in FIG. 7C. Adding or removing the spacer creates variance for different sizes of belts or webbing in the clip belt space 20.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A clip assembly comprising:
   a wire clip having a clip leg extending in a first direction, a clip hoop turning the clip into a clip rear portion extending in a second direction, spaced apart from the clip leg, the clip rear portion having a bend toward the clip leg to provide a clip return, forming a clip belt space within the clip;
   a clip leg retainer formed at a terminus of the clip leg, the clip leg retainer extending at an angle relative to the clip leg, the angle bending the clip leg retainer away from the clip rear portion;
   a mounting base having a mounting base leg channel for receiving a portion of the clip leg therein; and
   a fastener for securing the wire clip to the mounting base.

2. The clip assembly of claim 1, wherein the wire clip includes a pair of clip legs, a pair of clip hoops and a pair of clip rear portions joined together at a terminus of the clip return, the pair of clip legs, a pair of clip hoops and a pair of clip rear portions extending generally parallel with each other.

3. The clip assembly of claim 1, wherein the clip leg retainer is formed generally orthogonal to the clip leg.

4. The clip assembly of claim 1, further comprising at least one mounting base leg hole, formed in the mounting base and operable to receive the clip leg retainer to prevent sliding of the wire clip relative to the mounting base.

5. The clip assembly of claim 1, wherein the at least one mounting base leg hole includes two mounting base holes formed at different positions along a longitudinal axis of the mounting base, wherein the two mounting base holes permit fixing the wire clip to the mounting base in either a first direction or a second, opposite direction.

6. The clip assembly of claim 1, further comprising a spacer disposed above the clip leg at the bend in the wire clip.

7. The clip assembly of claim 6, wherein the spacer includes a spacer clip leg channel receiving the clip leg entirely therein.

8. The clip assembly of claim 6, wherein the spacer reduces a length of the clip belt space.

9. The clip assembly of claim 6, wherein the spacer includes a fabric catch protruding below a plane defined by the wire clip.

10. The clip assembly of claim 6, wherein the spacer includes a spacer clip return channel operable to receive at least a portion of the clip return therein.

11. The clip assembly of claim 1, wherein the mounting base includes a base hole for receiving the fastener for securing the wire clip to the mounting base.

12. The clip assembly of claim 1, wherein the mounting base includes a mounting base slot, the mounting base slot operable to receive a fastener therein for securing the mounting base to an object to be carried by the clip assembly.

13. The clip assembly of claim 12, wherein an upper surface of the mounting base slot is lower than an upper surface having a mounting base hole formed therethrough.

14. A clip assembly comprising:
   a wire clip having a pair of clip legs extending in a first direction, a pair of clip hoops turning the clip into a pair of clip rear portions, each extending in a second direction, opposite the first direction and spaced apart from the pair of clip legs, each of the pair of clip rear portions having a bend toward respective ones of each of the pair of clip legs to provide a pair of clip returns, forming a clip belt space within the clip;
   a mounting base having a pair of mounting base leg channel for receiving a portion of each of the pair of clip legs therein;
   a fastener for securing the wire clip to the mounting base, the fastener extending between the pair of clip legs;
   a pair of clip leg retainers formed at a terminus of each of the pair of clip legs, each of the pair of clip leg retainers extending at an angle relative to the respective ones of the pair of clip legs, the angle bending each of the pair of clip leg retainers away from each of the pair of clip rear portions; and
   at least one set of two mounting base leg holes, formed in the mounting base and operable to receive the pair of clip leg retainers to prevent sliding of the wire clip relative to the mounting base.

15. The clip assembly of claim 14, wherein the clip leg retainer is formed generally orthogonal to the clip leg.

16. The clip assembly of claim 14, wherein the at least one set of two mounting base leg hole is two sets of two mounting base holes, where each set is formed at different position along a longitudinal axis of the mounting base, wherein the two sets of two mounting base holes permit fixing the wire clip to the mounting base in either a first direction, when the pair of clip leg retainers are disposed in a first set of the two sets of two mounting base holes, or a second, opposite direction, when the pair of clip leg retainers are disposed in a second set of the two sets of two mounting base holes.

17. The clip assembly of claim 14, further comprising a spacer disposed above and spanning between each of the pair of clip legs at the bend in the wire clip, wherein:
   the spacer includes a pair of spacer clip leg channels receiving each of the pair of clip legs entirely therein;
   the spacer reduces a length of the clip belt space;
   the spacer includes a fabric catch protruding below a plane defined by the pair of clip legs of the wire clip; and
   the spacer includes a spacer clip return channel operable to receive at least a portion of the clip return therein.

18. A clip assembly comprising:
a wire clip having a pair of clip legs extending in a first direction, a pair of clip hoops turning the clip into a pair of clip rear portions, each extending in a second direction, opposite the first direction and spaced apart from the pair of clip legs, each of the pair of clip rear portions having a bend toward respective ones of each of the pair of clip legs to provide a pair of clip returns, forming a clip belt space within the clip;
a mounting base having a pair of mounting base leg channel for receiving a portion of each of the pair of clip legs therein;
a fastener for securing the wire clip to the mounting base, the fastener extending between the pair of clip legs;
a pair of clip leg retainers formed at a terminus of each of the pair of clip legs, each of the pair of clip leg retainers extending at an angle relative to the respective ones of the pair of clip legs, the angle bending each of the pair of clip leg retainers away from each of the pair of clip rear portions;
at least one set of two mounting base leg holes, formed in the mounting base and operable to receive the pair of clip leg retainers to prevent sliding of the wire clip relative to the mounting base; and
a spacer disposed above and spanning between each of the pair of clip legs at the bend in the wire clip, wherein:
the mounting base includes a mounting base slot, the mounting base slot operable to receive a fastener therein for securing the mounting base to an object to be carried by the clip assembly; and
an upper surface of the mounting base slot is lower than an upper surface having a mounting base hole formed therethrough.

19. The clip assembly of claim 18, wherein the at least one set of two mounting base leg hole is two sets of two mounting base holes, where each set is formed at different position along a longitudinal axis of the mounting base, wherein the two sets of two mounting base holes permit fixing the wire clip to the mounting base in either a first direction, when the pair of clip leg retainers are disposed in a first set of the two sets of two mounting base holes, or a second, opposite direction, when the pair of clip leg retainers are disposed in a second set of the two sets of two mounting base holes.

* * * * *